2,911,420

METHOD FOR THE SEPARATION OF DIFFICULTLY SEPARABLE MIXTURES OF CARBOXYLIC ACIDS

George P. Brown, Jr., Pittsburgh, Harry J. Elder, Tarentum, and Norman W. Franke, Penn Township, Allegheny County, Pa., assignors to Gulf Research & Development Company, Pittsburgh, Pa., a corporation of Delaware No Drawing. Application August 12, 1953
Serial No. 373,880

14 Claims. (Cl. 260—399)

This invention relates to a method for the separation of difficultly separable mixtures of carboxylic acids whose esters and thiol esters during distillation yield at least one fraction containing close-boiling esters or thiol esters of acids having different numbers of carboxyl groups per molecule. The invention also includes a convenient method for the synthetic production of relatively pure dibasic acid esters and thiol esters.

The synthesis of carboxylic acids by the oxidation of hydrocarbons, notably paraffin hydrocarbons and paraffin waxes, under controlled conditions, with an oxygen containing gas, nitric acid or other oxidizing agents, or with combinations thereof, produces complex, difficultly separable mixtures containing substantial proportions of mono- and di- or polybasic carboxylic acids. The mixtures of carboxylic acids obtained in this manner have a relatively low market value, per se. However, there is a substantial demand for the relatively pure constituents, and particularly for dibasic acids and derivatives thereof. Accordingly, separation into the respective constituents of the mixtures is desirable.

The usual methods of separation, e.g., solvent extraction, counter-current distribution, fractional crystallization and the like, at least in a commercially practical number of stages, have proved unsatisfactory for the complete separation of the mixtures of carboxylic acids referred to above, since the properties upon which these separations depend do not vary sufficiently from one compound to another. Fractional distillation of the mixture of carboxylic acids, per se, is also unsatisfactory because of the possibility of decomposition or interreaction. However, esterification of the mixture of carboxylic acids with an alcohol produces a mixture of esters which may be partially separated by fractional distillation at reduced pressures.

The combination of esterification and fractional distillation at reduced pressure, however, is ineffective to produce a complete separation of the mixture into its respective constituents. Such processes result in one or more fractions containing mixtures of close-boiling esters of acids having different numbers of carboxyl groups per molecule. Further distillation of these close-boiling ester mixtures serves no useful purpose, since no additional separation can be obtained.

It is an object of this invention to provide a method for obtaining a more complete separation of difficultly separable mixtures of carboxylic acids. A more detailed object of the invention is to provide a method for the separation of mixtures of carboxylic acids which contain constituents having different numbers of carboxyl groups per molecule, and whose esters and thiol esters upon distillation yield at least one fraction containing a mixture of close-boiling esters or thiol esters of acids having different numbers of carboxyl groups per molecule. Still another object is the provision of a convenient method for synthetically producing dibasic acid esters and thiol esters in relatively pure form from paraffin hydrocarbons. Other objects will appear hereinafter.

These and other objects are accomplished by this invention which includes forming a mixture of like derivatives of the acids contained in a mixture of carboxylic acids whose constituents contain different numbers of carboxyl groups per molecule, said derivatives being selected from the group consisting of esters of a monohydric alcohol and thiol esters of a monosulfhydric mercaptan. The resulting mixture of derivatives is then distilled to obtain at least one fraction containing a mixture of close-boiling derivatives of acids which have different numbers of carboxyl groups per molecule. The derivatives in this fraction are then reacted to form a mixture of like derivatives selected from the group consisting of esters and thiol esters respectively of a monohydric alcohol and a monosulfhydric mercaptan other than that originally combined in said fraction. The resulting derivative mixture is then distilled to separate derivatives of acids having different numbers of carboxyl groups per molecule. Although the above-described procedure is useful in separating mixtures of carboxylic acids of the kind indicated, the invention is also useful to separate mixtures of close-boiling esters, including thiol esters, of acids having different numbers of carboxyl groups per molecule. The invention further includes a convenient method for synthesizing and recovering relatively pure dibasic acid esters and thiol esters, which method is characterized by first forming a mixture of mono- and dibasic carboxylic acids by oxidation of paraffin hydrocarbons. The separated esters or thiol esters produced by the various modifications of the invention may, if desired, be treated, e.g., hydrolized, to regenerate the free carboxylic acids.

In the following description certain preferred modifications of the invention have been described. It is understood that these are by way of illustration only and are not to be considered as limiting.

In a broad sense, the invention is applicable to the separation of any mixture of carboxylic acids containing constituents having different numbers of carboxyl groups per molecule, and whose esters or thiol esters upon distillation yield at least one fraction containing a mixture of close-boiling esters or thiol esters of acids having different numbers of carboxyl groups per molecule. Thus, the invention is applicable to the separation of mixtures containing monobasic acids and polybasic acids or to mixtures containing only polybasic acids, so long as the latter mixtures contain polybasic acids which have different numbers of carboxyl groups per molecule. The mono- and polybasic acids may be aliphatic or aromatic, saturated or unsaturated, and may be substituted, so long as the unsaturation and/or substituents do not cause appreciable side reactions during the process.

Purely by way of example, the invention is adapted for the separation of mixtures containing one or more acids from at least two of the following classes: Monobasic—enanthic (heptanoic), caprylic, pelargonic, capric, lauric, myristic, palmitic, stearic, arachidic, behenic, lignoceric, cerotic and mellissic acids; dibasic—oxalic, malonic, succinic, glutaric, adipic, pimelic, suberic, azelaic, sebacic and dodecanedioic acids; polybasic—propane tricarboxylic and butane tetracarboxylic acids.

As stated, the invention is also applicable to the separation of mono- and polybasic carboxylic acid mixtures containing unsaturated acids. Representative of such mixtures are those containing one or more of the following: crotonic, angelic, tiglic, oleic, erucic, palmitolic, linoleic, linolenic, or eleostearic acids, maleic, pentenedioic, hexenedioic and fumaric acids.

The invention is also useful in the separation of mixtures of carboxylic acids containing aromatic mono- and polybasic acids, such as benzoic and phthalic acids. It should be understood that the invention is suitable for the separation of mixtures of acids containing members taken from more than one of the different classes noted above. As indicated, the invention is applicable to mixtures of the type described, where the esters or thiol esters of the acids in said mixture upon distillation yield a fraction containing a mixture of close-boiling esters or thiol esters of acids having different numbers of carboxyl groups per molecule.

Although the invention is broadly suited to the separation of mixtures containing a wide variety of mono- and polybasic carboxylic acids, regardless of the origin of the mixture, it has particular importance in connection with a method for synthesizing and recovering relatively pure dibasic acids, their esters or thiol esters, said method being characterized by the initial oxidation of paraffin hydrocarbons (particularly paraffin wax) to form a mixture of mono- and dibasic acids which is then resolved according to this invention. Such mixtures normally contain saturated aliphatic, monobasic and dibasic carboxylic acids having from about 2 to about 20 carbon atoms per molecule and are produced by the oxidation of paraffin hydrocarbons having from about 5 to about 40 carbon atoms per molecule and preferably from about 15 to about 40 carbon atoms per molecule.

While the invention is broadly suitable for the separation of carboxylic acid mixtures such as those set forth above, it has further utility in connection with the separation of difficultly separable mixtures of close-boiling esters of acids having different numbers of carboxyl groups per molecule, e.g., the ethyl ester of myristic acid $(C_{13}H_{27}COOC_2H_5$; B.P.$=154°$ C. at 5 mm. Hg) and the diethyl ester of sebacic acid $(C_2H_5 \cdot OOC \cdot C_8H_{16} \cdot COOC_2H_5$;

B.P.$=156°$ C. at 5 mm. Hg)

As indicated above the separatory method of this invention is characterized by first forming a mixture of like derivatives of a carboxylic acid mixture, the constituents of which contain different numbers of carboxyl groups per molecule, said derivatives being selected from the group consisting of esters of monohydric alcohols and thiol esters of monosulfhydric mercaptans. After the distillation of the mixture of derivatives to separate at least one fraction containing a mixture of the close-boiling esters or thiol esters, this fraction is reacted to form a mixture of like derivatives selected from the group consisting of esters of a monohydric alcohol and thiol esters of a monosulfhydric mercaptan other than that originally represented in the fraction. This results in a mixture of differently boiling derivatives of carboxylic acids having different numbers of carboxyl groups per molecule. Accordingly, the mixture of differently boiling derivatives is distilled to separate derivatives of different acids.

Since the separation process may involve the formation of either esters or thiol esters in the production of either the first or second derivative mixture, the invention encompasses four important modifications containing the combinations of derivatives defined below:

|     | First Derivative Mixture | Second Derivative Mixture |
| --- | --- | --- |
| (1) | Esters of Monohydric Alcohol. | Esters of Monohydric Alcohol. |
| (2) | ----do---- | Thiol Esters of Monosulfhydric Mercaptan. |
| (3) | Thiol Esters of Monosulfhydric Mercaptan. | Esters of Monohydric Alcohol. |
| (4) | ----do---- | Thiol Esters of Monosulfhydric Mercaptan. |

Of these four modifications the first is particularly important in view of its simplicity and directness. However, each modification is desirable as a method of preparing substantially pure esters and thiol esters of dibasic acids, for which there is a substantial demand in the synthetic lubricant field.

Referring now in detail to the first modification indicated above, the initial step involves the esterification of the acid mixture with a first monohydric alcohol. The particular monohydric alcohol employed in this esterification is not critical so long as a second monohydric alcohol, having a different number of carbon atoms, is available for the hereinafter described alcoholysis step. For practical reasons, the alcohol employed in the esterification reaction is preferably a low-boiling saturated aliphatic, primary, monohydric alcohol such as methanol, ethanol or propanol. However, other alcohols can be used. The alcohol chosen is desirably of the type indicated for reasons of economy, ease of esterification, ease of separation following alcoholysis, and in order to avoid the possibility of side reactions.

The conditions of the esterification reaction are conventional and need not be described in detail. However, for the sake of clarity it will be mentioned that the esterification is satisfactorily carried out by refluxing the carboxylic acid mixture with an excess of the alcohol and desirably in the presence of a small amount of suitable catalyst, e.g., sulfuric acid, dry hydrogen chloride, paratoluene sulfonic acid, or the like, for a period of from about 3 to about 10 hours. The time of reaction normally decreases with increased temperature of the reaction mixture. Although esterification may proceed to some degree at temperature as low as room temperature, elevated temperatures, e.g., from about 60° to 250° C. are preferably employed. Following esterification, the mixture may be distilled to remove the water of reaction and excess alcohol.

As indicated previously, the mixture of esters resulting from the above described esterification reaction may be fractionally distilled under reduced pressure in order to effect a partial separation. The pressure in the stillpot or reboiler is maintained sufficiently low to avoid decomposition of the constituents of the mixture undergoing distillation. Low-boiling fractions recovered from this distillation will contain monobasic acid esters in relatively pure form. Intermediate and high-boiling fractions may contain monobasic esters of greater molecular weight, dibasic esters, polybasic esters, or close-boiling mixtures thereof. The fractions containing substantially pure esters may be used as such or subjected to hydrolysis to recover the pure carboxylic acids. The fractions containing difficulty separable mixtures of close-boiling esters having different numbers of carboxyl groups per molecule are segregated for further treatment as described hereinafter. These difficultly separable fractions inherently have boiling points greater than 163° C. at 760 mm., since this is the boiling point of dimethyl oxalate, the lowest boiling dibasic ester.

It may be mentioned that many of the fractions resulting from the initial reduced pressure fractional distillation may not, in the first instance, be composed of entirely pure constituents. However, certain of these impure fractions may be completely separated by further fractional distillation or by other means. The remaining fractions are difficultly separable and further distillation is ineffective to complete their separation. These difficultly separable fractions are those segregated for further treatment according to this invention.

Illustrative of difficultly separable fractions containing close-boiling pairs of esters of mono- and dibasic acids are the following pairs of ethyl esters:

TABLE A

| Esters | Total No. Carbon and Oxygen Atoms per Molecule | Approx. B.P., ° C. | |
|---|---|---|---|
| | | at 5 mm. Hg | at 760 mm. Hg |
| Diethyl Ester of Oxalic Acid | 10 | 60 | 193 |
| Ethyl Ester of Heptanoic Acid | 11 | 60 | 193 |
| Diethyl Ester of Malonic Acid | 11 | 74 | 208 |
| Ethyl Ester of Caprylic Acid | 12 | 75 | 211 |
| Diethyl Ester of Succinic Acid | 12 | 83 | 219 |
| Ethyl Ester of Pelargonic Acid | 13 | 89 | 225 |
| Diethyl Ester of Glutaric Acid | 13 | 96 | 235 |
| Ethyl Ester of Capric Acid | 14 | 102 | 241 |
| Diethyl Ester of Adipic Acid | 14 | 112 | 258 |
| Ethyl Ester of Undecanoic Acid | 15 | 115 | 261 |
| Diethyl Ester of Pimelic Acid | 15 | 120 | 267 |
| Ethyl Ester of Undecanoic Acid | 15 | 115 | 261 |
| Diethyl Ester of Suberic Acid | 16 | 133 | 285 |
| Ethyl Ester of Lauric Acid | 16 | 131 | 282 |
| Diethyl Ester of Azelaic Acid | 17 | 145 | 300 |
| Ethyl Ester of Tridecanoic Acid | 17 | 142 | 298 |
| Diethyl Ester of Sebacic Acid | 18 | 156 | 310 |
| Ethyl Ester of Myristic Acid | 18 | 154 | 308 |
| Diethyl Ester of Malonic Acid | 11 | 74 | 208 |
| Ethyl Ester of Benzoic Acid | 11 | 76 | 213 |
| Diethyl Ester of o-Phthalic Acid | 16 | 140 | 296 |
| Ethyl Ester of Tridecanoic Acid | 17 | 142 | 298 |
| Diethyl Ester of Isophthalic Acid | 16 | 133 | 285 |
| Ethyl Ester of Lauric Acid | 16 | 131 | 282 |

Fractions containing close-boiling groups of esters of acids having different numbers of carboxyl groups per molecule, such as those listed in Table A, are those for which further treatment is necessary. Although the close-boiling groups listed in Table A are pairs, the invention is effective for separating larger groups of close-boiling esters of acids which have different numbers of carboxyl groups per molecule.

While the close-boiling ester pairs given above by way of example are ethyl esters, the invention is, of course, not limited thereto. Esterification of the mixtures of carboxylic acids of the type indicated with any monohydric alcohol will produce similar, close-boiling groups of esters of acids having different numbers of carboxyl groups per molecule. In instances of esterification with other alcohols, however, the acids represented in the close-boiling groups will normally be different.

The difficultly separable fractions containing binary or more complex mixtures of esters of acids having different numbers of carboxyl groups per molecule and which have been obtained from the fractional distillation of the initial ester mixture, are next individually subjected to alcoholysis with a different monohydric alcohol having a different number of carbon atoms from that of the first alcohol employed in the esterification reaction described above. The term "alcoholysis" as used in the accompanying specification and claims is employed in its usual sense as indicating the ester interchange resulting from the reaction of an alcohol with an ester.

The selection of the monohydric alcohol for the alcoholysis reaction also is not critical, except to the extent that this alcohol is of a different molecular weight than the alcohol employed in the esterification reaction. Again for practical reasons, this alcohol is desirably a primary, saturated aliphatic, monohydric alcohol. Thus, for example, where methyl alcohol is employed in the esterification reaction the alcohol chosen for alcoholysis may be ethyl, propyl, butyl, hexyl or octyl alcohol. Where, say, butyl alcohol is the alcohol chosen for esterification, the alcohol chosen for alcoholysis may be, for example, methyl, ethyl, propyl, amyl, hexyl, or octyl. While it is only necessary that the alkyl group of the alcohol used in the alcoholysis reaction contain one carbon atom more or less than the alkyl group of the alcohol used in esterification, it is desirable, in order to facilitate separation of the reaction products, that the alkyl group of this alcohol be smaller or larger by at least two and preferably by several carbon atoms. Use of a low-boiling alcohol in the esterification reaction followed by alcoholysis of the difficultly separable fractions with a higher-boiling alcohol is advantageous, since many of the longer chain alcohol esters of dicarboxylic acids have commercial utility, as such. No further reactions may be necessary in such instances. The sequence involving esterification with a low-boiling alcohol and alcoholysis with a higher boiling alcohol is also preferred for ease of separation of the regenerated alcohol.

The conditions of the alcoholysis or ester exchange are, as are those for the esterification reaction, entirely conventional and form no part of this invention. For this reason, no detailed description of these reaction conditions is necessary. However, for the purpose of clarity it may be briefly mentioned that the reaction may be satisfactorily carried out by heating the fraction containing the difficultly separable mixture of close-boiling esters with a suitable monohydric alcohol for a period of from about 1 to about 10 hours, preferably in the presence of a suitable catalyst, e.g., sulfuric acid, hydrogen chloride, or p-toluene sulfonic acid, preferably at a temperature of from about 60° C. to about 250° C. Other temperatures may, of course, be used.

The alcoholysis or ester exchange reaction described above serves to replace the alkyl group of the alcohol employed in the esterification reaction with the larger or smaller alkyl group of the alcohol employed in the alcoholysis reaction, thus forming a mixture of esters having substantially different boiling points and simultaneously regenerating the alcohol first used for esterification of the said mixture. The regenerated alcohol is removed from the mixture, preferably by distillation during the alcoholysis reaction, and the remaining ester mixture is fractionally distilled, at reduced pressure if necessary or desired, to isolate one or more constituents thereof.

If desired, one or more of the pure esters thus isolated may be subjected to hydrolysis in the presence of dilute acid in order to regenerate the carboxylic acid component of the ester. The conditions of hydrolysis are entirely conventional. By way of example, hydrolysis of an isolated ester may be effected by heating the ester with an excess of water in the presence of a catalyst, e.g., p-toluene sulfonic acid, hydrochloric acid, etc., for about one to forty hours at a temperature of from about 90° C. to about 200° C. Alternatively, the free carboxylic acids may be regenerated by alkaline hydrolysis, i.e., by reaction of the ester with an excess of water under the reaction conditions mentioned and in the presence of catalytic amounts (i.e., about 1% to 5% equivalent weight) of an alkaline polyvalent metal hydroxide such as an alkaline earth hydroxide. A still further suitable method of regenerating the free carboxylic acids from the esters involves saponification of the esters with an alkali metal hydroxide, e.g., NaOH or KOH, within the ranges of reaction conditions mentioned, to form the alkali metal salt of the acid in question. The free acid may then be regenerated by acidification of the alkali metal salt with a mineral acid.

The carboxylic acid and liberated alcohol resulting from hydrolysis of an ester can be separated according to any conventional procedure. For example, if the liberated alcohol is low-boiling, it can be removed by distillation. If the liberated acid is of relatively high molecular weight, it will be water insoluble and can be separated by decanting. These or other differences in the properties of the alcohol and acid may be utilized to effect the separation.

The remaining modifications of the invention involving the use of the sulfur analogs of the alcohols, the mercaptans, are carried out in a manner similar to reaction sequence described above. Thus, mercaptans may be employed to form the original derivative mixture, or they may be employed in the derivative interchange reaction, or they may be employed in the derivative interchange reaction, or they may be employed in both reactions. In certain instances, however, the mercaptans may not react with ease directly with the acids, esters, or thiol esters. In these instances it is advantageous to form a mixture of acid anhydrides from the acid mixture, the ester mixture or thiol ester mixture, and then to react the acid anhydride mixture with the mercaptan, as described in U.S. Patent 2,550,141. If anhydride formation is difficult, it may be preferred to form the acyl halides of the acids involved by reaction thereof with phosphorous trichloride or pentachloride, or thionyl chloride, and then to react the acyl halides with the desired mercaptan. The formation of acyl halides and reaction thereof with mercaptans are conventional reactions and need not be described in detail. In either alternative method of obtaining thiol esters it is normally necessary to regenerate the acids from their derivatives by hydrolysis or the like, before forming the acid anhydrides or the acyl halides.

Thus, the sulfur analogs of each of the alcohols disclosed above may be used in the formation of either the first or second derivative mixtures involved in the process. Substantially pure thiol esters resulting from the process may be treated similarly as the corresponding esters to regenerate the free carboxylic acids, where desired.

It has been mentioned that esterification and distillation of a mixture of carboxylic acids whose constituents contain different numbers of carboxyl groups yield one or more fractions containing close-boiling groups of esters. As a matter of interest, it has been observed that carboxylic acid esters having about the same total number of carbon and oxygen atoms have about the same boiling points. The same is considered to be generally true for thiol esters having about the same number of carbon, oxygen and sulfur atoms. Thus, the esterification of crude acid mixtures with an alcohol produces a variety of esters of the same alcohol, some of which esters may be monobasic and some of which may be polybasic. Those monobasic and polybasic esters having about the same total number of carbon and oxygen atoms will normally occur in the same distillate fraction. Thus, the diethyl ester of sebacic acid and the ethyl ester of myristic acid would be expected and are found in the same distillate fraction. Reference to Table A, supra, serves to illustrate the rule more clearly. The members of each of the pairs of esters listed have approximately the same total numbers of carbon and oxygen atoms per molecule and about the same boiling points.

From the foregoing discussion, it is evident that mere esterification (or thiol esterification) and distillation of a crude mixture of mono- and polybasic acids, yield certain difficulty separable fractions. The present invention combines with these partially effective operations the step of alcoholysis (or its equivalents involving mercaptans) of the individual difficultly separable fractions, whereby a substantially complete separation may be obtained by further distillation.

According to the principles of this invention, the alcoholysis or ester exchange reaction (or its equivalent involving a mercaptan) carried out on the difficultly separable ester mixture replaces the alkyl group of the esters in this mixture with the different alkyl group of the alcohol or mercaptan employed in the interchange reaction. The resulting esters or thiol esters differ markedly in their boiling points, since the monobasic esters or thiol esters are changed in size only by the difference in the number of carbon atoms in the alcohols or mercaptans, whereas the dibasic and/or polybasic esters or thiol esters are changed in size by a multiple of this difference.

Accordingly, while the final derivatives are homologous to the original derivatives, the final polybasic derivatives are further removed in their homologous series from their corresponding original derivatives than are the final monobasic derivatives from their corresponding original derivatives. This is important to the success of the invention, since the boiling point of the members of an homologous series increase with increasing molecular weight and decrease with decreasing molecular weight. The disproportionate change in molecular weights for the various derivatives produces a corresponding disproportionate change in boiling points.

The invention may be better understood by reference to the following specific example:

*Example 1*

One hundred parts of a refined paraffin wax (M.P. 132° F.) and 400 parts of 90% nitric acid were placed in a glass flask equipped with a reflux condenser and a stirrer. The mixture was heated to 75° C. and maintained at that temperature for 30 hours. The stirrer was operated during the entire period to insure thorough mixing of the reactants. During the course of the experiment 3150 parts of 97% nitric acid were added to maintain the acid concentration at 90%. At the end of 30 hours, the reaction was complete as shown by the disappearance of the wax phase. A mixture containing monobasic and dibasic carboxylic acids, recovered from the reaction product, was esterified by refluxing with an excess of ethanol in the presence of a small amount of a p-toluene sulfonic acid catalyst for a period of about 5 hours. Water of esterification and excess ethanol were removed by distillation. The remaining ester mixture was distilled through a fractionating column under a high vacuum. Some distilled fractions contained relatively pure ethyl esters. Other fractions were found to contain mixtures of ethyl esters of monobasic and dibasic acids. For example, the cut boiling near 53° C. at 1 mm. Hg was found to contain about equal parts of ethyl myristate (B.P. 154° C. at 5 mm. Hg) and diethyl sebacate (B.P. 156° C. at 5 mm. Hg). Separation of this cut by further distillation was found to be impractical. Accordingly, the mixture was converted to 2-ethylhexylesters by alcoholysis with 2-ethylhexanol. The alcoholysis was carried out by heating the mixture of ethyl myristate and diethyl sebacate with an excess of 2-ethylhexanol, and a small amount of p-toluene sulfonic acid catalyst for about 5 hours. The ethanol regenerated during alcoholysis was distilled over during the reaction. The resulting mixture of 2-ethylhexyl esters was then distilled through a fractionating column under a high vacuum. Two fractions consisting respectively of pure 2-ethylhexyl myristate (B.P. 194° C. at 1 mm. Hg) and di-2-ethylhexyl sebacate (B.P. 233° C. at 1 mm. Hg) were obtained. The yield of 2-ethylhexyl myristate based on the theoretical yield calculated from the amount of ethyl myristate present in the charge to the ester exchange was found to be 97.6% and the corresponding yield of di-2-ethylhexyl sebacate was found to be 86.5%.

Similarly, the procedure outlined above can be used for separating other monobasic acids from the dibasic and polybasic acids. Other pairs of monohydric alcohols also can be used, such as methanol and butanol or propanol and hexanol. As indicated, the acid derivatives formed in either the first or second instance may, if desired, involve the use of a mercaptan instead of an alcohol.

The results of the foregoing example clearly illustrate the ability of the invention to effect the separation of an otherwise difficultly separable mixture of acids or difficultly separable mixture of esters. As previously indicated, the pure esters recovered by this method can be reacted, e.g., hydrolyzed, to form the free acids, if the acids are the desired final products. As was also indicated, however, there is a substantial demand for the carboxylic acid esters, per se, and particularly for the dibasic acid esters and thiol esters. An example of this is the di-2-ethylhexyl sebacate referred to in Example 1, which compound has wide utility as a plasticizer and as a synthetic lubricant. For this reason, it is often unnecessary and undesirable to regenerate the carboxylic acid from the isolated esters.

Example 1 also is illustrative of the use of the invention to synthesize and recover dibasic acid esters in relatively pure form from paraffin hydrocarbons.

From the foregoing description and specific example, it is apparent that this invention has utility in the separation of mixtures of carboxylic acids whose esters and thiol esters upon distillation yield one or more fractions containing mixtures of esters or thiol esters of acids which have different numbers of carboxyl groups per molecule.

The invention described at length above has numerous advantages, not the least among which are those of simplicity, low cost and directness. In the first described modification, there are necessarily only two reactions involved, esterification and alcoholysis. Since the alcohol employed in the former reaction is regenerated during the latter reaction, it may be reused in subsequent separations. Since the product of the second reaction or alcoholysis, may be controlled to produce esters having industrial demand, the steps of the separation serve the additional purpose of converting the acid to the desired derivative. In addition to the advantages listed above, the process may be carried out with inexpensive, conventional apparatus. Many of the same advantages are present in those modifications involving mercaptans.

Typical procedures resulting in mixtures of mono- and dibasic carboxylic acids separable by this invention are the partial oxidation of paraffin hydrocarbons having at least 5 and preferably 10 to 40 carbon atoms per molecule with air or oxygen and the partial oxidation of like hydrocarbons with concentrated nitric acid. The former may be satisfactorily carried out by contacting the hydrocarbons with an oxygen-containing gas for between about 2 and about 100 hours at temperatures between about 100° and about 200° C. The nitric acid oxidation of hydrocarbons is normally carried out by treating the hydrocarbon charge with nitric acid having a strength of at least about 50% and preferably of at least 70%, at temperatures of from about 50° C. to about 140° C. and preferably from 60° to 100° C. for a period ranging from about 2 hours to about 100 or more hours.

Various modifications of the foregoing invention which do not depart from the spirit thereof will readily occur to those skilled in the art. Accordingly, the invention is limited only by the scope of the appended claims.

We claim:

1. A method for separating a mixture of carboxylic acids containing constituents having different numbers of carboxyl groups per molecule, comprising forming a mixture of like derivatives of said acids, said derivatives being selected from the group consisting of esters of a monohydric alcohol and thiol esters of a monosulfhydric mercaptan, distilling the resulting mixture of derivatives to obtain at least one fraction containing a mixture of close-boiling derivatives of acids which have different numbers of carboxyl groups per molecule, reacting the derivatives in this fraction to form a mixture of like derivatives selected from the group consisting of esters and thiol esters respectively of a monohydric alcohol and a monosulfhydric mercaptan having a different number of carbon atoms than that originally combined in said fraction, and distilling the resulting derivative mixture to separate derivatives of acids having different numbers of carboxyl groups per molecule.

2. A method for separating a mixture of carboxylic acids containing constituents having different numbers of carboxyl groups per molecule, comprising esterifying the acid mixture with a first monohydric alcohol, distilling the resulting mixture of esters to obtain at least one fraction which contains a mixture of close-boiling esters of acids which have different numbers of carboxyl groups per molecule, subjecting this fraction to alcoholysis with a second monohydric alcohol that has a different number of carbon atoms per molecule, thus forming a mixture of esters whose constituents have substantially different boiling points and simultaneously regenerating said first alcohol, removing said first alcohol from the mixture, and distilling the remaining ester mixture to separate esters of acids having different numbers of carboxyl groups per molecule.

3. The method of claim 1 including the additional step of treating an ester thus separated to regenerate a carboxylic acid.

4. A method for separating a mixture of monobasic and dibasic carboxylic acids, comprising esterifying the acid mixture with a first monohydric alcohol, distilling the resulting ester mixture to obtain at least one fraction which contains a binary mixture of the close-boiling esters of a monobasic and a dibasic carboxylic acid, subjecting this fraction to alcoholysis with a second monohydric alcohol that has a different number of carbon atoms per molecule, thus forming a mixture of esters whose constituents have substantially different boiling points and simultaneously regenerating said first alcohol, removing said first alcohol from the mixture and distilling the remaining ester mixture to separate a monobasic acid ester and a dibasic acid ester.

5. A method for separating a mixture of saturated aliphatic monobasic and dibasic carboxylic acids, comprising esterifying the acid mixture with a first monohydric alcohol, distilling the resulting ester mixture to obtain at least one fraction which contains a binary mixture of close-boiling esters of a monobasic and dibasic acid, subjecting this fraction to alcoholysis with a second monohydric alcohol that has a different number of carbon atoms per molecule, thus forming a mixture of esters whose constituents have substantially different boiling points and simultaneously regenerating said first alcohol, removing said first alcohol from the mixture, distilling the remaining ester mixture to separate a monobasic acid ester and a dibasic acid ester.

6. A method for separating a mixture of monobasic and dibasic carboxylic acids comprising esterifying the acid mixture with a first low-boiling, monohydric alcohol, distilling the resulting ester mixture to obtain at least one fraction which contains a binary mixture of close-boiling esters of a monobasic and a dibasic acid, subjecting this fraction to alcoholysis with a second, higher molecular weight monohydric alcohol, thus forming a mixture of esters whose constituents have substantially different boiling points and simultaneously regenerating said first alcohol, removing said first alcohol from the ester mixture, distilling the remaining ester mixture to separate a monobasic acid ester and a dibasic acid ester.

7. A method for separating a mixture of monobasic and dibasic carboxylic acids comprising esterifying the acid mixture with a first monohydric alcohol, distilling the resulting ester mixture to separate those monobasic esters boiling below the lowest boiling dibasic acid ester in the mixture, further fractionating the balance of the ester mixture to obtain at least one fraction containing a binary mixture of close-boiling esters of a monobasic and a dibasic acid, subjecting this fraction to alcoholysis with a second monohydric alcohol that has a different number of carbon atoms per molecule, thus forming a mixture of esters whose constituents have substantially different boiling points and simultaneously regenerating said first alcohol, removing said first alcohol from the mixture, and fractionating the remaining ester mixture to separate a monobasic acid ester and a dibasic acid ester.

8. The process of synthesizing and recovering in relatively pure form dibasic acid esters and thiol esters, comprising partially oxidizing a hydrocarbon mixture to obtain a mixture of monobasic and dibasic carboxylic acids, forming a mixture of like derivatives of said acids, said derivatives being selected from the group consisting of esters of a monohydric alcohol and thiol esters of a monosulfhydric mercaptan, distilling the resulting mixture of derivatives to obtain at least one fraction which contains a binary mixture of close-boiling derivatives of a monobasic and dibasic acid, reacting the derivatives in this fraction to form a mixture of like derivatives selected from the group consisting of esters and thiol esters respectively of a monohydric alcohol and a monosulfhydric mercaptan having a different number of carbon atoms than that originally combined in said fraction, and distilling the resulting mixture to separate a dibasic acid derivative.

9. The process of synthesizing and recovering in relatively pure form dibasic acid esters, comprising partially oxidizing a hydrocarbon mixture to obtain a mixture of monobasic and dibasic carboxylic acids, esterifying the acid mixture with a first monohydric alcohol, distilling the resulting ester mixture to obtain at least one fraction which contains a binary mixture of the close-boiling esters of a monobasic and a dibasic carboxylic acid, subjecting this fraction to alcoholysis with a second monohydric alcohol that has a different number of carbon atoms per molecule, thus forming a mixture of esters whose constituents have substantially different boiling points and simultaneously regenerating said first alcohol, removing said first alcohol and distilling the remaining mixture to separate a dibasic acid ester.

10. A method for separating a mixture of close-boiling esters of a monohydric alcohol and a plurality of carboxylic acids having different numbers of carboxyl groups per molecule, comprising subjecting the ester mixture to alcoholysis with a monohydric alcohol having a different number of carbon atoms than the alcohol combined in the esters, thus forming a mixture of esters having substantially different boiling points and simultaneously regenerating the alcohol originally combined in the esters, removing the regenerated alcohol from the mixture, and fractionating the remaining ester mixture to separate esters of acids having different numbers of carboxyl groups per molecule.

11. A method for separating a mixture of carboxylic acids containing constituents having different numbers of carboxyl groups per molecule comprising forming a mixture of like derivatives of said acids, said derivatives being selected from the group consisting of esters of a monohydric alcohol having the general formula ROH and thiol esters of a monosulfhydric mercaptan having the general formula RSH, where R is a hydrocarbon radical, distilling the resulting mixture of derivatives to obtain at least one fraction containing a mixture of close-boiling derivatives of acids which have different numbers of carboxyl groups per molecule, reacting the derivatives in this fraction to form a mixture of like derivatives selected from the group consisting of esters and thiol esters respectively of a monohydric alcohol and a monosulfhydric mercaptan of the kind indicated above but having a different number of carbon atoms than that originally combined in said fraction, and distilling the resulting derivative mixture to separate derivatives of acids having different number of carboxyl groups per molecule.

12. The process of claim 11 where R is an aliphatic hydrocarbon radical.

13. The process of claim 11 where R is an alkyl radical.

14. The process of claim 11 where R is an alkyl radical containing 1 to 8 carbon atoms.

References Cited in the file of this patent

UNITED STATES PATENTS

| | | |
|---|---|---|
| 1,848,724 | Jaeger | Mar. 8, 1932 |
| 2,560,156 | Cavanaugh et al. | July 10, 1951 |
| 2,588,435 | Van Loon et al. | Mar. 11, 1952 |

OTHER REFERENCES

Markley: Fatty Acids, 1947, pages 293–295, 581–583.
Ralston: Fatty Acids and Their Derivatives, 1948, pages 498–499, 505, 509, 512.